United States Patent
Decesaris et al.

(10) Patent No.: US 9,098,645 B2
(45) Date of Patent: *Aug. 4, 2015

(54) INCREASING DATA TRANSMISSION RATE IN AN INTER-INTEGRATED CIRCUIT ('I²C') SYSTEM

(75) Inventors: Michael Decesaris, Carrboro, NC (US); Luke D. Remis, Raleigh, NC (US); Gregory D. Sellman, Morrisville, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 317 days.

This patent is subject to a terminal disclaimer.

(21) Appl. No.: 13/530,473

(22) Filed: Jun. 22, 2012

(65) Prior Publication Data

US 2013/0346763 A1 Dec. 26, 2013

(51) Int. Cl.
- *G06F 1/04* (2006.01)
- *G06F 1/12* (2006.01)
- *G06F 5/06* (2006.01)
- *G06F 13/42* (2006.01)

(52) U.S. Cl.
CPC .... *G06F 13/4291* (2013.01); *G06F 2213/0016* (2013.01)

(58) Field of Classification Search
CPC ... H04L 25/0272; H04L 5/003; H04L 5/1446; G06F 2213/0016; G06F 13/4282
See application file for complete search history.

(56) References Cited

U.S. PATENT DOCUMENTS

| | | |
|---|---|---|
| 5,272,725 A | 12/1993 | Jones et al. |
| 6,321,366 B1 | 11/2001 | Tseng et al. |
| 7,174,406 B1 | 2/2007 | Abdallah et al. |
| 7,417,576 B2 | 8/2008 | Prestros |
| 7,694,053 B2 | 4/2010 | Kippley et al. |
| 7,805,559 B1 | 9/2010 | Stumpf et al. |
| 8,453,006 B2 | 5/2013 | Lin |
| 8,892,799 B2 | 11/2014 | Frese |
| 2007/0143512 A1 | 6/2007 | Kuo |
| 2008/0122426 A1 | 5/2008 | Prestros |
| 2011/0060856 A1 | 3/2011 | Huang et al. |
| 2011/0194595 A1* | 8/2011 | Shetty ............................ 375/224 |
| 2013/0343197 A1 | 12/2013 | DeCesaris et al. |
| 2013/0346658 A1 | 12/2013 | DeCesaris et al. |
| 2013/0346763 A1 | 12/2013 | DeCesaris et al. |
| 2013/0346835 A1 | 12/2013 | DeCesaris et al. |
| 2014/0019644 A1 | 1/2014 | Decesaris et al. |
| 2014/0207984 A1 | 7/2014 | Maung et al. |

* cited by examiner

*Primary Examiner* — Jaweed A Abbaszadeh
*Assistant Examiner* — Xuxing Chen
(74) *Attorney, Agent, or Firm* — Edward J. Lenart; Katherine S. Brown; Kennedy Lenart Spraggins LLP

(57) ABSTRACT

Increasing data transmission rate in an I²C system that includes an I²C source device and an destination device, the source device coupled to the destination device through an SDL and SCL, including: receiving in parallel, by the destination device, an SDL data signal and an SCL data signal, the SCL data signal encoded with bits; and, for each bit of the SCL data signal: detecting rise time of the bit and determining, in dependence upon the detected rise time, whether the bit represents a first binary value or a second binary value including: determining that the bit represents a first binary value when the detected rise time is less than a predefined threshold; and determining that the bit represents a second binary value when the detected rise time is not less than the predefined threshold.

19 Claims, 5 Drawing Sheets

INCREASING DATA TRANSMISSION RATE IN AN INTER-INTEGRATED CIRCUIT ('I²C') SYSTEM

BACKGROUND OF THE INVENTION

1. Field of the Invention

The field of the invention is data processing, or, more specifically, methods, apparatus, and products for increasing data transmission rate in an Inter-Integrated Circuit ('I²C') system.

2. Description of Related Art

The Inter-Integrated Circuit ('I²C') data communications interface and protocol is used widely throughout computing and electronic systems for various reasons including the robustness and stability of the protocol. The protocol, however, does have a few limitations. In practice, the theoretic value for bandwidth provided by the I²C standard is difficult to realize due to the interface's use of passive drivers, which often miss the rise time requirements of the interface specification. Thus, most designs use a bus frequency considerably lower than the specified maximum possible bus speed. What is needed, therefore, is a way to increase the I2C bandwidth or data rate without increasing bus frequency.

SUMMARY OF THE INVENTION

Methods, apparatus, and products for increasing data transmission rate in an Inter-Integrated Circuit ('I²C') system are disclosed in this specification. The I²C system includes an I²C source device and an I²C destination device, where the I²C source device is coupled to the I²C destination device through a Serial Data Line ('SDL') and a Serial Clock Line ('SCL'). Increasing data transmission rate in the I²C system in accordance with embodiments of the present invention includes: transmitting, by the I²C source device to the I²C destination device an SDL data signal on the SDL; and in parallel with the SDL data signal, transmitting, by the I²C source device to the I²C destination device, an SCL data signal on the SCL, the SCL data signal encoded with a plurality of bits, each bit encoded with voltage alternating between a logic low voltage and a logic high voltage, including: transmitting one or more bits value having a rise time less than a predefined threshold and representing a first binary value; and transmitting one or more bits having a rise time not less than the predefined threshold and representing a second binary value.

Increasing data transmission rate in the I²C system in accordance with embodiments of the present invention also includes: receiving in parallel, by the I²C destination device from the I²C source device, an SDL data signal on the SDL and an SCL data signal on the SCL, the SCL data signal encoded with a plurality of bits, each bit encoded with voltage alternating between a logic low voltage and a logic high voltage; and for each bit of the SCL data signal: detecting, by the I²C destination device, rise time of the bit; and determining, in dependence upon the detected rise time, whether the bit represents a first binary value or a second binary value including: determining that the bit represents a first binary value when the detected rise time is less than a predefined threshold; and determining that the bit represents a second binary value when the detected rise time is not less than the predefined threshold.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
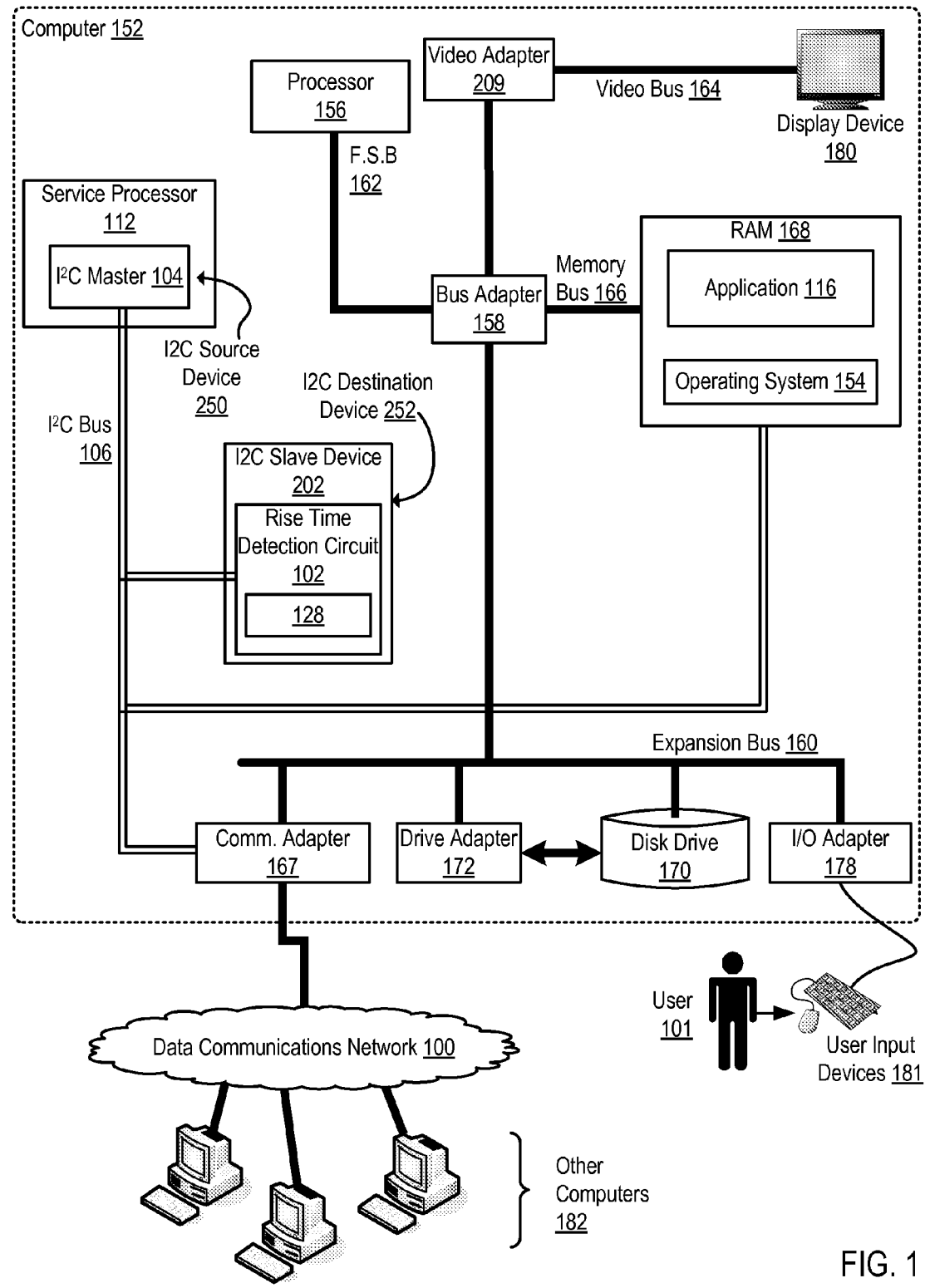
FIG. 1 sets forth a block diagram of an example system for increasing data transmission rate in an I2C system according to embodiments of the present invention.

Exemplary methods, apparatus, and products for increasing data transmission rate in an I²C system in accordance with embodiments of the present invention are described with reference to the accompanying drawings, beginning with FIG. 1. FIG. 1 sets forth a block diagram of an example system for increasing data transmission rate in an I²C system according to embodiments of the present invention. The system of FIG. 1 includes automated computing machinery comprising an exemplary computer (152) useful in increasing data transmission rate in an I²C system according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an application (116), a module of computer program instructions for carrying out user-level data processing tasks. Examples of such applications include word processing applications, spreadsheet applications, multimedia library and playback applications, presentation applications, database applications, and so on. Also stored in RAM (168) is an operating system (154). Operating systems useful for increasing data transmission rate in an I²C system according to embodiments of the present invention include UNIX™, Linux™, Microsoft XP™, Windows 7™, AIX™, IBM's i5/OS™, and others as will occur to those of skill in the art. The operating system (154) and application (116) in the example of FIG. 1 are shown in RAM (168), but many components of such software typically are stored in non-volatile memory also, such as, for example, on a disk drive (170).

The computer (152) in the example of FIG. 1 also includes a service processor (112). A service processor as the term is used in this specification refers to a processor, field programmable gate array ('FPGA'), application specific integrated circuit ('ASIC') microcontroller, or the like, distinct from the main CPU (156), which manages platform-specific functions. Examples of such management include monitoring environmental conditions, handling certain error conditions, and otherwise communicating out-of-band with components of the computer (152). A service processor may include Read Only Memory ('ROM'), RAM, Electrically Erasable Programmable ROM ('EEPROM'), or other memory that includes computer program instructions executable by a processing core of the service processor (112).

In the example of FIG. 1, the service processor (112) communicates with components of the computer (152) through an out-of-band I²C bus (106). An I²C bus is a multi-master serial single-ended computer bus that is typically used to attach low-speed peripherals to a motherboard, embedded system, mobile communications device, serial processor, or other electronic device. I²C generally utilizes a two-wire bus, one wire comprising a serial data line ('SDL') and other wire comprising a serial clock line ('SCL'). The service processor (112) in the example of FIG. 1 is configured as an I²C master (104), while other peripherals, such as the communications adapter (167), RAM (168), and the I²C slave device (202) are configured as I²C slaves.

The I2C source device (250) and the I2C destination device (252) are configured for increasing data transmission rate in the I²C system of FIG. 1 in accordance with embodiments of the present invention. A 'source device' as the term is used here is a source of a data transmission, a sender, while a 'destination device' as the term is used here is a destination of the data transmission, a receiver. Readers of skill in the art will recognize that although the I²C master (104) is implemented in the example of FIG. 1 as an I²C source device (250), an I²C master (104) may also be implemented as an I²C destination device (252). Likewise, the I²C slave device (202) in the example of FIG. 1 may be implemented as either a source or destination device.

The I²C source device (250) in the example of FIG. 1 operates for increasing data transmission rate by transmitting by to the I²C destination device an SDL data signal on the SDL of the I²C bus (106) and, in parallel with the SDL data signal, transmitting, to the I²C destination device (252), an SCL data signal on the SCL. The SCL data signal is encoded with a plurality of bits, with each bit encoded with voltage alternating between a logic low voltage and a logic high voltage. In the example of FIG. 1 the I²C source device (250) may transmit an SCL data signal by: transmitting one or more bits value having a rise time less than a predefined threshold and representing a first binary value (such as a value of '1') and transmitting one or more bits having a rise time not less than the predefined threshold and representing a second binary value (such as a value of '0'). In this way the I²C source device (250) utilizes the SCL—a clock line rather than a data line—as a data line by indicating binary values of a '1' and '0' through rise time modifications of each bit. By transmitting both the SCL data signal and SDL data signal to the I²C destination device (252), the data rate of the transmission is effectively doubled. For every clock period of the I²C destination device (252), the I²C destination device (252) receives two binary values, one on the SDL signal and one on the SCL signal.

The I²C destination device (252) in the example of FIG. 1 includes a rise time detection circuit (102) which is configured to receive, in parallel an SDL data signal on the SDL and an SCL data signal on the SCL, and for each bit of the SCL data signal: detect rise time of the bit and determine, in dependence upon the detected rise time, whether the bit represents a first binary value ('1', for example) or a second binary value ('0', for example). The rise time detection circuit of the I²C destination device (252) may determine whether the bit represents a first or second binary value by determining that the bit represents a first binary value when the detected rise time is less than a predefined threshold and determining that the bit represents a second binary value when the detected rise time is not less than the predefined threshold.

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for increasing data transmission rate in an I²C system according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for increasing data transmission rate in an I²C system according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
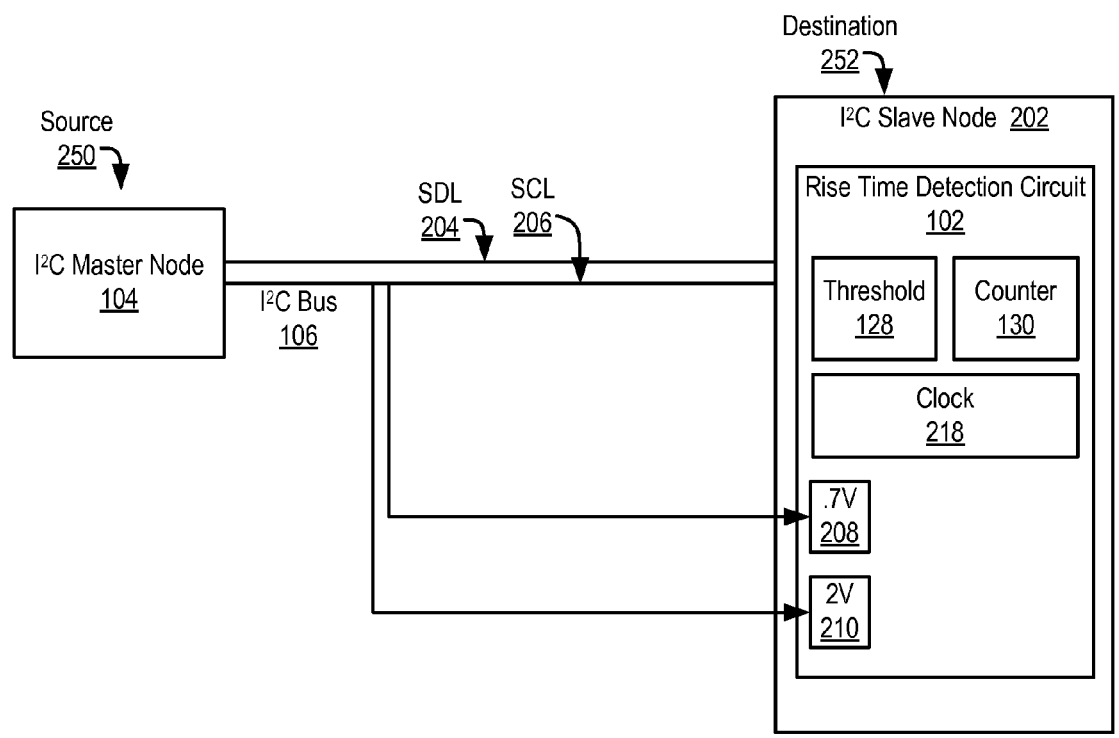
FIG. 2 sets forth a block diagram of another exemplary system for increasing data transmission rate in an I2C system according to embodiments of the present invention.

For further explanation, FIG. 2 sets forth a block diagram of another exemplary system for increasing data transmission rate in an I²C system according to embodiments of the present invention. The system of FIG. 2 includes an I²C master (104) configured as an I²C source device (250) and an I²C slave (202) configured as an I²C destination device (252). The master (104) is coupled for data communications to the slave (202) by an I²C bus (106) that includes a plurality of signal lines: a serial clock line ('SCL') (206) and a serial data line ('SDL') (204). The I²C slave (202) also includes a rise time detection circuit (102) and the SCL (206) is coupled to the rise time detection circuit (102). The rise time detection circuit (102) is configured to monitor a voltage of the SCL (206), where the voltage alternates between a logic low voltage (such as 0V) and a logic high voltage (such as 3.3V).

The I²C source device (250) in the example of FIG. 2 transmits, to the I²C destination device (252), an SDL data signal on the SDL. In parallel with the SDL data signal (204), the I²C source device (250) also transmits, to the I²C destination device (252), an SCL data signal on the SCL (206). The SCL data signal (206) is encoded with a plurality of bits, where each bit is encoded with voltage alternating between a logic low voltage and a logic high voltage. The I²C source device (250) transmits an SCL data signal on the SCL (206) by transmitting one or more bits value having a rise time less than a predefined threshold and representing a first binary value ('1') and transmitting one or more bits having a rise time not less than the predefined threshold and representing a second binary value ('0').

The rise time detection circuit (102) of the I²C destination device (252) receives, in parallel, the SDL data signal (204) and the SCL data signal (206). For each bit of the SCL data signal, the rise time detection circuit (102) detecting rise time of the bit. The rise time detection circuit (102) may detect the rise time of the bit by detecting a first voltage of the bit on the SCL (206), where the first voltage is greater than the logic low voltage. The first voltage, for example, may be implemented as 0.7V. In the example of FIG. 2, the rise time detection circuit (102) includes two inputs (208, 210), where one input (208) is configured to detect the first voltage (in this example, 0.7V) and the other input (210) is configured to detect a second voltage (in this example, 2V).

Responsive to the detection of the first voltage, the rise time detection circuit (102) starts an automatically incrementing counter (130). The counter increments once for each clock (218) period of the rise time detection circuit (102). The period of the clock (218) of the rise time detection circuit (102) is less than the rise time of the I²C signal line.

The rise time detection circuit (102) then detects a second voltage (2V in this example) of the bit on the SCL (206). The second voltage is greater than the first voltage and less than the logic high voltage. Responsive to the detection of the second voltage, the rise time detection circuit (102) stops the automatically incrementing counter (130).

The rise time detection circuit (102) then calculates, in dependence upon the clock period of the rise time detection circuit and the value of the counter (130), a rise time for the bit on the SCL (206). The rise time detection circuit (102) may calculate such a rise time by calculating the product of the clock (218) period of the rise time detection circuit (102) and the value of the counter.

The rise time detection circuit (102) then determines, in dependence upon the detected rise time, whether the bit represents a first binary value or a second binary value including: determining that the bit represents a first binary value (such as a '0' for example) when the detected rise time is less than a predefined threshold (128) and determining that the bit represents a second binary value (such as a '1' for example) when the detected rise time is not less than the predefined threshold (128).

Figure 3:
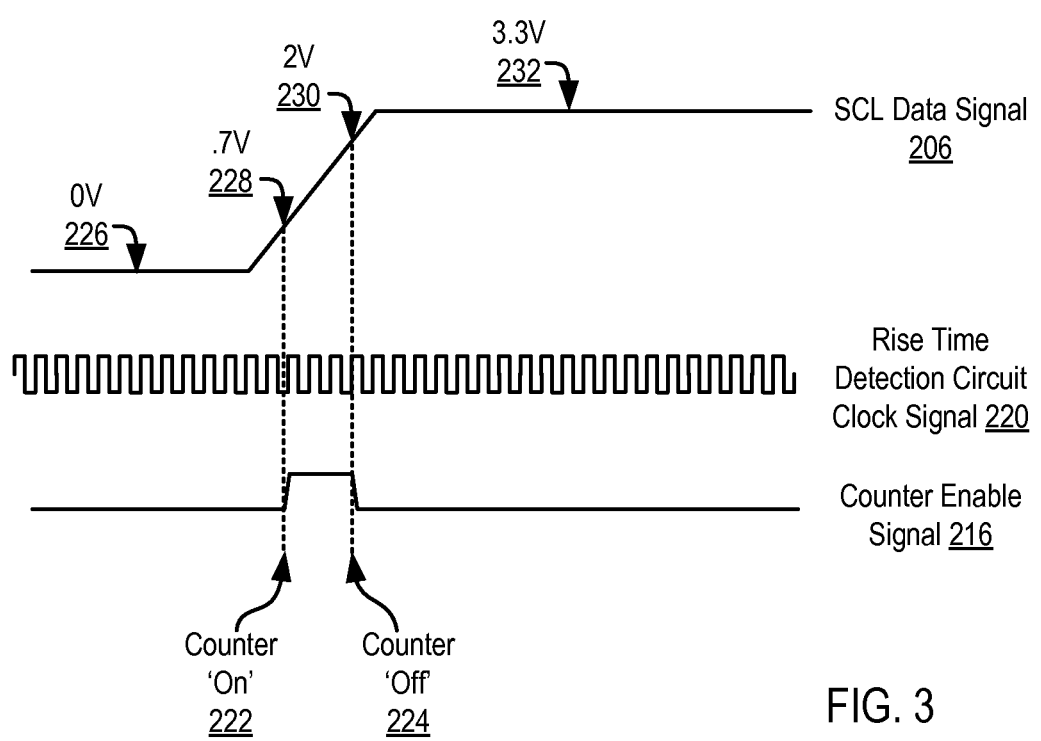
FIG. 3 sets forth an example signal timing diagram illustrating some of the signals in the example system of FIG. 2.

For further explanation, FIG. 3 sets forth an example signal timing diagram illustrating some of the signals in the example system of FIG. 2. The example timing diagram of FIG. 3 includes an I²C signal, the SCL (206), the clock signal (220) of the clock in the rise time detection circuit (102) and an enable signal (216) for the automatically incrementing counter (130).

In the example of FIG. 3, as the bit of the SCL data signal (206) rises, the rise time detection circuit (102) detects a first voltage (228) of 0.7V on the signal line. Responsive to the detection of the first voltage (228), the rise time detection circuit (102) starts (222) an automatically incrementing counter (130) through use of the enable signal (216). The counter increments once for each clock signal (220) period of the rise time detection circuit (102).

As the bit of the SCL data signal (206) continues to rise, the rise time detection circuit (102) detects a second voltage (230) of 2V on the signal line. Responsive to the detection of the second voltage (230), the rise time detection circuit (102) stops (224) the automatically incrementing counter, again through use of the counter enable signal (216).

The rise time detection circuit (102) then calculates a rise time for the bit of the SCL signal (206) in dependence upon the period of the clock signal (220) and the value of the counter. In the example of FIG. 3, three periods of the rise time detection circuit clock signal (220) elapse during the time in which the counter is automatically incrementing. That is, the value of the counter is three. Consider, as an example, that the period of the clock signal is 10 nanoseconds (ns). In such an example, the rise time detection circuit may calculate a rise time of 30 ns (the counter value of 3 multiplied by 10 nanoseconds per clock period).

The rise time detection circuit (102) then determines whether the calculated rise time is less than a predefined threshold. If the calculated rise time is less than the predefined threshold, the I²C destination device (252) determines that determining that the bit represents a first binary value ('1' for example); and if the calculated rise time is not less than the predefined threshold, the I²C destination device (252) determines that the bit represents a second binary value when the detected rise time is not less than the predefined threshold.

Figure 4:
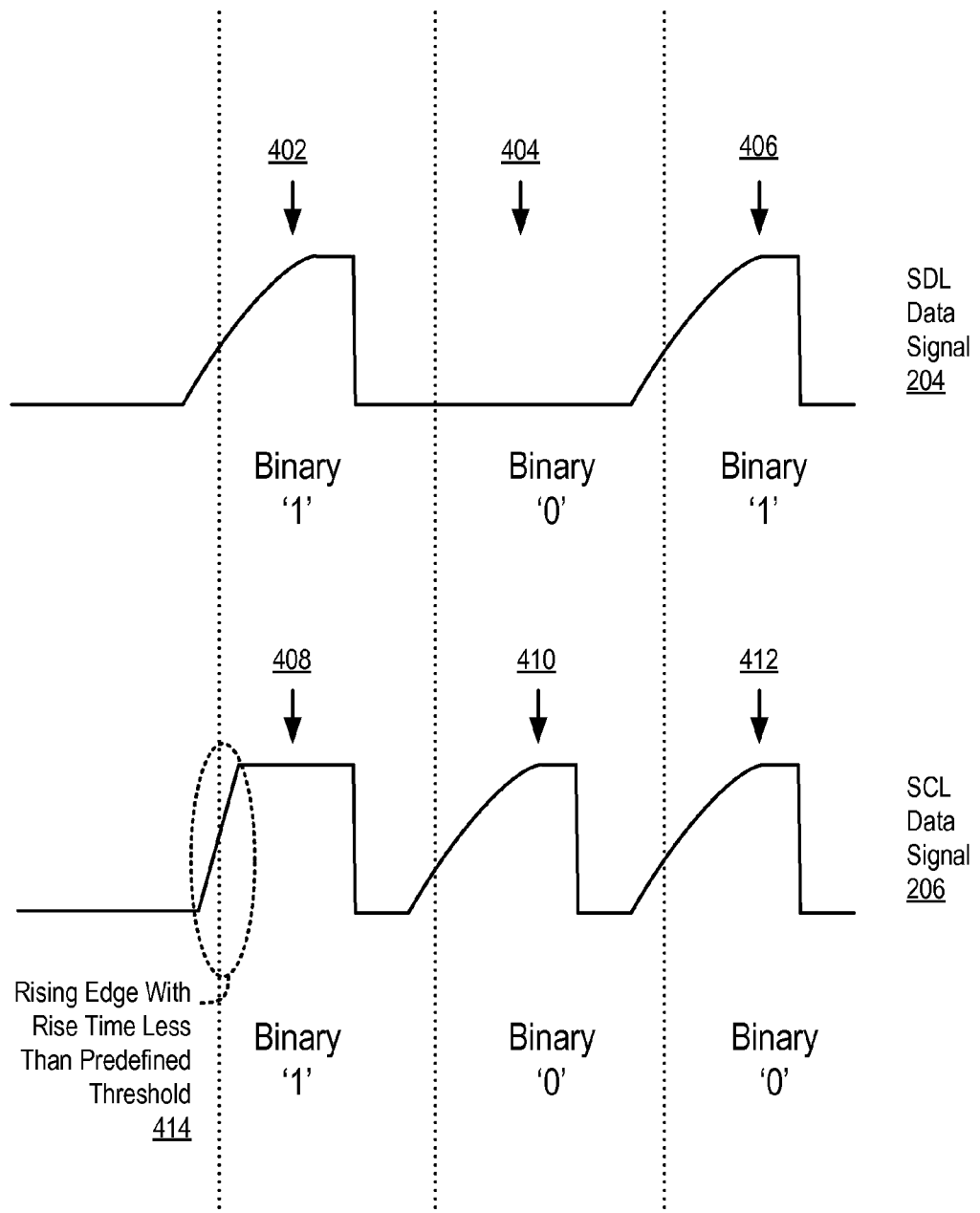
FIG. 4 sets forth an example signal timing diagram illustrating an SDL data signal in parallel with an SCL data signal, where the SCL data signal includes bits having varying rise times.

For further explanation, FIG. 4 sets forth an example signal timing diagram illustrating an SDL data signal in parallel with an SCL data signal, where the SCL data signal includes bits having varying rise times. The example timing diagram of FIG. 4 includes three clock periods of an SDL data signal (204) and an SCL data signal (206). Although only three bits are depicted in the example of FIG. 4, readers of skill in the art will recognize that a bit pattern transmitted from an I²C source device to an I²C destination device may include any number of bits.

In the example of FIG. 4, the first bit (402) of the SDL signal (204) is a logic high voltage, representing a binary '1'. The second bit (404) of the SDL signal (204) is a logic low voltage, representing a binary '0'. The third bit (406) of the SDL signal (204) is a logic high voltage, representing a binary '1'.

The first bit (408) of the SCL data signal (206) includes a rising edge (414) with rise time less than the predefined threshold. Such a rising edge (414) represents a binary '1' in the example of FIG. 4. The remaining bits (410, 412) of the SCL data signal, having a rising edge with rise time not less than the predefined threshold, represent a binary '0' even while maintaining a logic high voltage level.

In this example timing diagram, the destination device will clock in the binary bits in the following order:
  On the first clock, SDL bit (402) and SCL bit (408) are clocked in: 11;
  On the second clock, SDL bit (404) and SCL bit (410) are clocked in: 00; and On the third clock, SDL bit (406) and SCL bit (412) are clocked in: 10.

The destination device may be configured to interpret these bits in any way: pre-pending the three bits of the SDL data signal to the three bits of the SCL data signal (resulting in a bit pattern of 101100), pre-pending the three bits of the SCL data signal to the three bits of the SDL data signal (resulting in a bit pattern of 100101), concatenating bits from each clock cycle (resulting in a bit pattern of 110010) and in other ways as will occur to readers of skill in the art.

Figure 5:
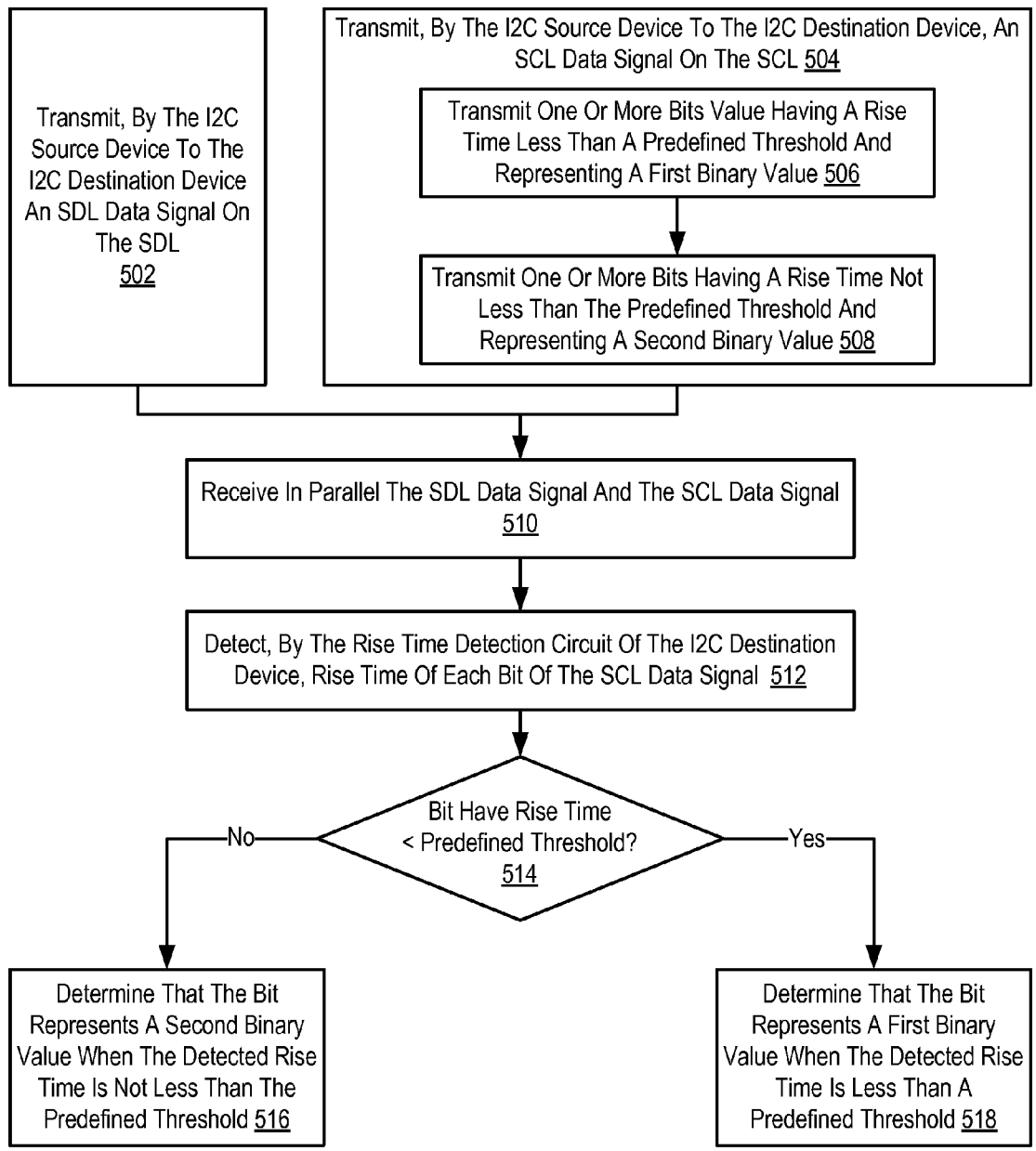
FIG. 5 sets forth a flow chart illustrating an exemplary method for increasing data transmission rate in an I2C system according to embodiments of the present invention.

For further explanation, FIG. 5 sets forth a flow chart illustrating an exemplary method for increasing data transmission rate in an I2C system according to embodiments of the present invention. The example method of FIG. 5 is carried out in an I$^2$C system similar to that of FIG. 1 or FIG. 2 that includes an I$^2$C source device (250), an I$^2$C destination device (252), and an I$^2$C bus that includes an SDL (204) and SCL (206) coupling the I$^2$C source device (250) and the I$^2$C destination device (252).

The method of FIG. 5 includes transmitting (502), by the I$^2$C source device to the I$^2$C destination device, an SDL data signal on the SDL. The method of FIG. 5 also includes transmitting (504), in parallel with the SDL data signal, by the I$^2$C source device to the I$^2$C destination device, an SCL data signal on the SCL. In the method of FIG. 5, the SCL data signal encoded with a plurality of bits with each bit encoded with voltage alternating between a logic low voltage and a logic high voltage. Also in the method of FIG. 5, transmitting (504) an SCL data signal on the SCL includes transmitting (506) one or more bits value having a rise time less than a predefined threshold and representing a first binary value and transmitting (508) one or more bits having a rise time not less than the predefined threshold and representing a second binary value.

Transmitting (506) one or more bits value having a rise time less than a predefined threshold may be carried out by driving the bits having a first binary value to a logic high with an active driver. Driving the bits having a first binary value to a logic high with an active driver may be carried out with a tri-state buffer or other active driver.

Transmitting (508) one or more bits having a rise time not less than the predefined threshold and representing a second binary value may be carried out by passively driving the bits having a second binary value to a logic high. Passively driving the bits having a second binary value to a logic high may be carried out with a pull-resistor.

The method of FIG. 5 also includes receiving (510) in parallel, by the I$^2$C destination device from the I$^2$C source device, an SDL data signal on the SDL and an SCL data signal on the SCL. For each bit of the SCL data signal, the method of FIG. 5 includes detecting (512), by the I$^2$C destination device, rise time of the bit; and determining (514), in dependence upon the detected rise time, whether the bit represents a first binary value or a second binary value. The method of FIG. 5 also includes determining (518) that the bit represents a first binary value when the detected rise time is less than a predefined threshold and determining (518) that the bit represents a second binary value when the detected rise time is not less than the predefined threshold.

In the method of FIG. 5, the I$^2$C destination device may include a rise time detection circuit. In such embodiments, detecting (512) rise time of the bit may be carried out by: detecting, by the rise time detection circuit, a first voltage on the bit, the first voltage being greater than the logic low voltage; starting, by the rise time detection circuit responsive to the detection of the first voltage, an automatically incrementing counter, the counter incrementing once for each clock period of the rise time detection circuit; detecting, by the rise time detection circuit, a second voltage on the bit, the second voltage greater than the first voltage and less than the logic high voltage; stopping, by the rise time detection circuit responsive to the detection of the second voltage, the automatically incrementing counter; and calculating, by the rise time detection circuit in dependence upon the clock period of the rise time detection circuit and the value of the counter, a rise time for the bit.

Although the I$^2$C source device is depicted several times in this specification as an I$^2$C master, where the I$^2$C destination device is depicted several times as an I$^2$C slave, readers of skill in the art will recognize that the I$^2$C source device may be implemented as either an I$^2$C master or slave and the I$^2$C destination device may be implemented as either an I$^2$C master or slave. That is, in some embodiments, the I$^2$C source device is an I$^2$C master, while the I$^2$C destination device is an I$^2$C slave. In some embodiments, the I$^2$C source device is an I$^2$C slave, while the I$^2$C destination device is an I$^2$C master. Further, the system need not be reconfigured to change these designations. The act of transmitting data or receiving data is the characteristic that defines whether an I$^2$C master is a destination device or source device and whether an I$^2$C slave is a destination device or source device.

In some embodiments, an I$^2$C master will initiate a handshake with an I$^2$C slave upon the slave's addition to the bus, determining whether the I$^2$C slave is configured for parallel data transmission as set forth in the method of FIG. 5. In such an embodiment the I2C master transmits a predefined bit pattern to the I$^2$C slave on the SCL and receives, from the I$^2$C slave, the predefined bit pattern on the SCL if the I$^2$C slave is configured for parallel data transmission. Once the handshake is performed, the I$^2$C master may communicate with the I$^2$C slave—in either read or write—in parallel with both the SCL and SDL signal lines.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of increasing data transmission rate in an Inter-Integrated Circuit ('I$^2$C') system, the I$^2$C system comprising an I$^2$C source device and an I$^2$C destination device, the I$^2$C source device coupled to the I$^2$C destination device through a Serial Data Line ('SDL') and a Serial Clock Line ('SCL'), the method comprising:

receiving in parallel, by the I$^2$C destination device from the I$^2$C source device, an SDL data signal on the SDL and an SCL data signal on the SCL, the SCL data signal encoded with a plurality of bits, each bit encoded with voltage alternating between a logic low voltage and a logic high voltage; and for each bit of the SCL data signal:

detecting, by the I$^2$C destination device, rise time of the bit; and determining, in dependence upon the detected rise time, whether the bit represents a first binary value or a second binary value including:

determining that the bit represents a first binary value when the detected rise time is less than a predefined threshold; and determining that the bit represents a second binary value when the detected rise time is not less than the predefined threshold.

2. The method of claim 1, wherein the I$^2$C destination device includes a rise time detection circuit and detecting rise time of the bit further comprises:

detecting, by the rise time detection circuit, a first voltage on the bit, the first voltage being greater than the logic low voltage;

starting, by the rise time detection circuit responsive to the detection of the first voltage, an automatically incrementing counter, the counter incrementing once for each clock period of the rise time detection circuit;

detecting, by the rise time detection circuit, a second voltage on the bit, the second voltage greater than the first voltage and less than the logic high voltage;

stopping, by the rise time detection circuit responsive to the detection of the second voltage, the automatically incrementing counter; and calculating, by the rise time detection circuit in dependence upon the clock period of the rise time detection circuit and the value of the counter, a rise time for the bit.

3. The method of claim 1, wherein the I²C source device comprises one of an I²C master or an I²C slave, the I²C destination device comprises one of an I²C master or an I²C slave, the I²C source and destination devices are not of the same type, and the method further comprises:
   determining, by the I²C master prior to reception of the SDL data signal and SCL data signal in parallel, whether the I²C slave is configured for parallel data transmission, including:
   transmitting, by the I²C master, a predefined bit pattern to the I²C slave on the SCL; and
   receiving, by the I²C master from the I²C slave, the predefined bit pattern on the SCL if the I²C slave is configured for parallel data transmission.

4. The method of claim 1 wherein:
   the I²C destination device comprises an I²C master; and
   the I²C source device comprises an I²C slave.

5. The method of claim 1 wherein:
   the I²C destination device comprises an I²C slave; and
   the I²C source device comprises an I²C master.

6. A rise time detection circuit of an Inter-Integrated Circuit ('I²C') destination device for increasing data transmission rate in an I²C system, the I²C system comprising an I²C source device, the I²C source device coupled to the I²C destination device through a Serial Data Line ('SDL') and a Serial Clock Line ('SCL'), the circuit configured to: method comprising:
   receive in parallel, by the rise time detection circuit of the I²C destination device from the I²C source device, an SDL data signal on the SDL and an SCL data signal on the SCL, the SCL data signal encoded with a plurality of bits, each bit encoded with voltage alternating between a logic low voltage and a logic high voltage; and
   for each bit of the SCL data signal:
   detect, by the rise time detection circuit of the I²C destination device, rise time of the bit; and
   determine, in dependence upon the detected rise time, whether the bit represents a first binary value or a second binary value including:
      determine that the bit represents a first binary value when the detected rise time is less than a predefined threshold; and
      determine that the bit represents a second binary value when the detected rise time is not less than the predefined threshold.

7. The circuit of claim 6, wherein detecting rise time of the bit further comprises:
   detecting a first voltage on the bit, the first voltage being greater than the logic low voltage;
   starting, responsive to the detection of the first voltage, an automatically incrementing counter, the counter incrementing once for each clock period of the rise time detection circuit;
   detecting a second voltage on the bit, the second voltage greater than the first voltage and less than the logic high voltage;
   stopping, responsive to the detection of the second voltage, the automatically incrementing counter; and
   calculating, in dependence upon the clock period of the rise time detection circuit and the value of the counter, a rise time for the bit.

8. The circuit of claim 6 wherein:
   the I²C destination device comprises an I²C master; and
   the I²C source device comprises an I²C slave.

9. The circuit of claim 6 wherein:
   the I²C destination device comprises an I²C slave; and
   the I²C source device comprises an I²C master.

10. A method of increasing data transmission rate in an Inter-Integrated Circuit ('I²C') system, the I²C system comprising an I²C source device and an I²C destination device, the I²C source device coupled to the I²C destination device through a Serial Data Line ('SDL') and a Serial Clock Line ('SCL'), the method comprising:
   transmitting, by the I²C source device to the I²C destination device, an SDL data signal on the SDL; and
   in parallel with the SDL data signal, transmitting, by the I²C source device to the I²C destination device, an SCL data signal on the SCL, the SCL data signal encoded with a plurality of bits, each bit encoded with voltage alternating between a logic low voltage and a logic high voltage, including:
      transmitting one or more bits value having a rise time less than a predefined threshold and representing a first binary value; and
      transmitting one or more bits having a rise time not less than the predefined threshold and representing a second binary value,
   wherein the I²C destination device is configured to: receive the SDL data signal and the SCL data signal in parallel; detect, for each bit of the SCL data signal, rise time of the bit; and determine, in dependence upon the detected rise time, a binary value for each bit of the SCL data signal.

11. The method of claim 10, wherein the I²C source device comprises one of an I²C master or an I²C slave, the I²C destination device comprises one of an I²C master or an I²C slave, the I²C source and destination devices are not of the same type, and the method further comprises:
   determining, by the I²C master prior to transmission of the SCL data signal, whether the I²C slave is configured for parallel data transmission, including:
   transmitting, by the I²C master, a predefined bit pattern to the I²C slave on the SCL; and
   receiving, by the I²C master from the I²C slave, the predefined bit pattern on the SCL if the I²C slave is configured for parallel data transmission.

12. The method of claim 10 wherein:
   transmitting one or more bits value having a rise time less than a predefined threshold and representing a first binary value further comprises driving the bits having a first binary value to a logic high with an active driver; and
   transmitting one or more bits having a rise time not less than the predefined threshold and representing a second binary value further comprises passively driving the bits having a second binary value to a logic high.

13. The method of claim 10 wherein:
   the I²C destination device comprises an I²C master; and
   the I²C source device comprises an I²C slave.

14. The method of claim 10 wherein:
   the I²C destination device comprises an I²C slave; and
   the I²C source device comprises an I²C master.

15. An apparatus for increasing data transmission rate in an Inter-Integrated Circuit ('I²C') system, the I²C system comprising an I²C source device and an I²C destination device, the I²C source device coupled to the I²C destination device through a Serial Data Line ('SDL') and a Serial Clock Line ('SCL'), the apparatus comprising a computer processor, a computer memory operatively coupled to the computer processor, the computer memory having disposed within it computer program instructions that, when executed by the computer processor, cause the apparatus to carry out the steps of:

transmitting, by the I²C source device to the I²C destination device, an SDL data signal on the SDL; and in parallel with the SDL data signal, transmitting, by the I²C source device to the I²C destination device, an SCL data signal on the SCL, the SCL data signal encoded with a plurality of bits, each bit encoded with voltage alternating between a logic low voltage and a logic high voltage, including:

transmitting one or more bits value having a rise time less than a predefined threshold and representing a first binary value; and transmitting one or more bits having a rise time not less than the predefined threshold and representing a second binary value, wherein the I²C destination device is configured to: receive the SDL data signal and the SCL data signal in parallel; detect, for each bit of the SCL data signal, rise time of the bit; and determine, in dependence upon the detected rise time, a binary value for each bit of the SCL data signal.

16. The apparatus of claim 15, wherein the I²C source device comprises one of an I²C master or an I²C slave, the I²C destination device comprises one of an I²C master or an I²C slave, the I²C source and destination devices are not of the same type, and the apparatus further comprises computer program instructions that when executed cause the apparatus to carry out the steps of:

determining, by the I²C master prior to transmission of the SCL data signal, whether the I²C slave is configured for parallel data transmission, including:

transmitting, by the I²C master, a predefined bit pattern to the I²C slave on the SCL; and receiving, by the I²C master from the I²C slave, the predefined bit pattern on the SCL if the I²C slave is configured for parallel data transmission.

17. The apparatus of claim 15 wherein:

transmitting one or more bits value having a rise time less than a predefined threshold and representing a first binary value further comprises driving the bits having a first binary value to a logic high with an active driver; and transmitting one or more bits having a rise time not less than the predefined threshold and representing a second binary value further comprises passively driving the bits having a second binary value to a logic high.

18. The apparatus of claim 15 wherein:
the I²C destination device comprises an I²C master; and
the I²C source device comprises an I²C slave.

19. The apparatus of claim 15 wherein:
the I²C destination device comprises an I²C slave; and
the I²C source device comprises an I²C master.

* * * * *